J. E. DOYLE.
PRINTING PRESS APPLIANCE.
APPLICATION FILED JULY 9, 1914.
Reissued May 23, 1916.
14,136.
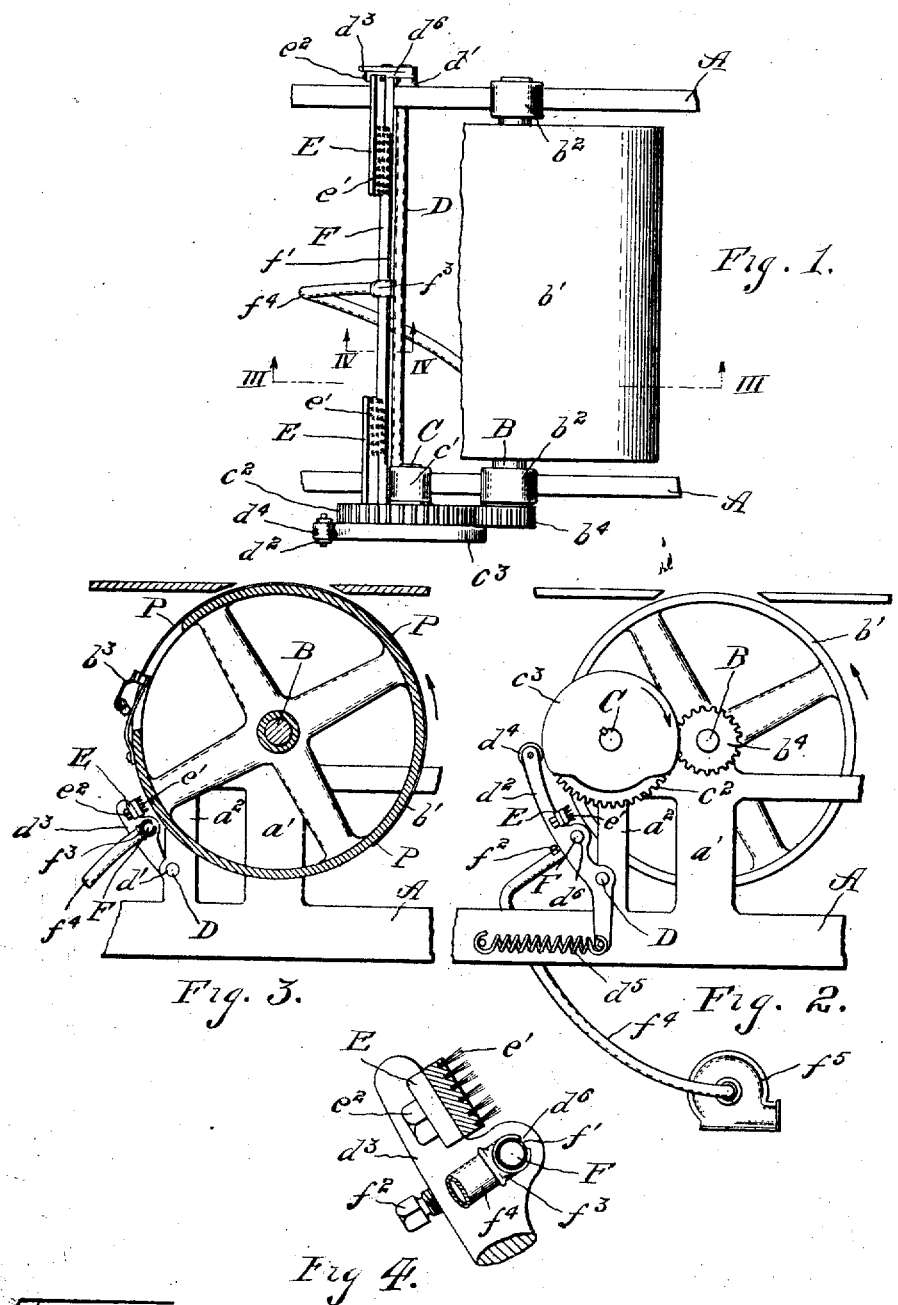
Witnesses:
Herman Eisele.
Mary Coleman.
Inventor:
James E. Doyle
by his Attorney
Louis B. Mueller.

UNITED STATES PATENT OFFICE.

JAMES E. DOYLE, OF CLEVELAND, OHIO, ASSIGNOR OF ONE-HALF TO CHARLES S. BRITTON, OF CLEVELAND, OHIO.

PRINTING-PRESS APPLIANCE.

14,136. Specification of Reissued Letters Patent. Reissued May 23, 1916.

Original No. 1,043,812, dated November 12, 1912. Serial No. 684,111. Application for reissue filed July 9, 1914. Serial No. 850,056.

*To all whom it may concern:*

Be it known that I, JAMES E. DOYLE, a citizen of the United States, residing at Cleveland, in the county of Cuyahoga and State of Ohio, have invented a new and useful Improvement in Printing-Press Appliances, of which the following is a specification, the principle of the invention being herein explained and the best mode in which I have contemplated applying that principle, so as to distinguish it from other inventions.

My invention is associated with a printing press, while its more specific nature is an improvement with an appliance calculated to perfect the finished impression.

The object is the provision of means which which will positively and continuously remove even minute sediment from the sheet just prior to its contact with the ink and so insure solidly inked areas and half tones which will be uniformly unspeckled.

The said invention consists of means hereinafter fully described and particularly set forth in the claims.

The annexed drawing and the following description set forth in detail certain means embodying my invention, the disclosed means, however, constituting but one of various mechanical forms in which the principle of the invention may be applied.

Figure 1 is a plan of a two-revolution cylinder-press, a portion of the cylinder being cut away to better disclose the application of my inventive appliance. Fig. 2 is an end elevation of Fig. 1. Fig. 3 is a vertical section on line III—III of Fig. 1 looking in the direction of the arrows. Fig. 4 is an enlarged section on line IV—IV of Fig. 1, likewise looking in the direction of the arrows.

The construction shown, as sufficient for the purpose in hand, comprises the frame A upon which are mounted preferably integral standards, the rear and forward pairs being respectively designated $a'$ and $a^2$. Mounted across the frame in suitable bearings $b^2$, directly above the standards $a'$, is a primary shaft B and rotatably mounted upon this shaft is an improved type of cylinder press proper $b'$ about which the paper sheets to be printed are intended to be once revolved. The successive sheets are automatically compelled to travel with the periphery of the cylinder through the medium of gripping mechanism which, since it forms no part of this invention, is designated entire as $b^3$. The direction of movement of of the paper which has been marked by the reference character P is contra-clockwise according to the direction of vision in Figs. 2 and 3 after approaching from the right and continuing again horizontally to the left. Mounted upon one extremity of the shaft B is a driving pinion $b^4$.

A stub shaft C is mounted in a suitable bearing $c'$ situated approximately over one standard $a^2$. Fixed in turn near the outer end of the shaft C and in fact so as to intersect the same vertical plane as the pinion $b^4$ is a gear $c^2$ which is adapted to mesh therewith as clearly seen in Fig. 1. A cam $c^3$, the operative purpose of which will be directly manifested, is keyed to the shaft C exteriorly adjacent the gear $c^2$. A rod D is also mounted for movement across the standards $a^2$ within suitable bearings $d'$. A pair of actuating levers $d^2$ $d^3$ are keyed intermediately of their lengths to opposite ends of the rod D. The lever $d^2$ is somewhat longer than the lever $d^3$, and rests within substantially the same vertical plane as the the cam $c^3$. A roller $d^4$ is secured to the upper extremity of the lever $d^2$, whose lower extremity is yieldingly attached to the frame A through the agency of a tension spring $d^5$, whereby the roller is normally held in engagement with the surface of the cam. As should now be apparent the movement of the cylinder $b'$ is transmitted in sequence to the pinion $b^4$, gear $c^2$ and cam $c^3$ and hence to both the levers $d^2$ and $d^3$ in the form of intermittent oscillatory movement toward and away from its own surface.

Fixedly mounted upon the two levers $d^2$ $d^3$ is a member E to which a plurality of brushes $e'$ are removably attached by means of screws $e^2$. The brushes $e'$ project toward and are adapted to intermittently contact with the surface of the cylinder $b'$. The periods of contact are necessarily determined by the oscillation of the lever $d^2$ $d^3$ and agreeably predetermined by the peripheral contour of the cam in order to insure the operative results which are sought. Also mounted in bearings $d^6$ upon the levers $d^2 d^3$ and likewise and necessarily extending across the frame, though below the brushes $e'$, is a pipe F. This pipe is provided with a longitudinal slot $f'$ and is capable of being fixed in various positions about its own axis through the medium of set screws $f^2$ whereby the location of the slot with respect to both the cylinder $b'$ and brushes $e'$, and hence either the direction or intensity of the suction effect may be altered at will. In the exemplification shown the central part of the pipe is provided with a T $f^6$ with which a flexible tube $f^4$ communicates, and with which latter an electrically operated suction fan $f^5$ is connected.

The operation of my appliance is as follows: It being necessary in the exemplification shown, in order to avoid interference of delivery of successive sheets, to have the cylinder revolve twice for each sheet that is to be printed no novelty is alleged as regards such arrangement. It being desirable, furthermore, to have the brushes $e'$ held out of engagement with the surface of the cylinder until immediately after the front edge of the sheet with its attached and outwardly projecting gripping mechanism $b^3$ has passed, no novelty is alleged as regards such arrangement; the peripheral surface of cam $c^3$ will be presumed as of a contour to meet the above requirements. In short, the brushes and suction will each operate alternately upon the sheet and upon the bare cylinder. Any individual sheet on approaching as already stated from the right, will be gripped and drawn diagonally downward to the left as appears in Fig. 3. Just prior to the passage of its front edge beyond and below the arc of oscillation of the brushes $e'$ the contact of the roller $d^4$ will be with that part of the peripheral surface of the cam $c^3$ which is immediately in advance of its depressed portion, as clearly indicated in Fig. 2. Consonantly, immediately after such front edge has passed the brushes, they will be permitted alternately to contact the remaining area of the sheet and most of the bare cylinders respectively, and so perform their function. In the meantime all particles of sediment will be continuously removed by enforced passage through the pipe F and the sheet immediately thereafter presented to the ink as required for consummate neatness.

My invention being thus described with sufficient thoroughness, what I desire to secure by Letters Patent and therefore claim specifically, is:

1. A printing press appliance comprising the combination with a rotary cylinder on which a paper sheet is adapted to be revolved at every other revolution of said cylinder, a paper-cleaning device movably mounted adjacent said cylinder, having a long narrow suction slot extending transversely of said paper sheet and in close proximity to said cylinder, means for producing a suction effect of sufficient intensity through said slot to alternately remove the dust and loose particles of paper from said sheet and cylinder by said suction effect, gripping mechanism carried on said cylinder for drawing a sheet of paper past the edges of said suction-slot and around said cylinder, and means for automatically moving said device out of the path of revolution of said gripping mechanism.

2. A printing-press appliance comprising the combination of sheet-conveying means; suction mechanism, including a dust-intake device movably disposed in proximity to said sheet-conveying means; and automatically operating means for moving said dust-intake device relative to said sheet-conveying means at predetermined intervals.

3. A printing-press appliance comprising the combination of sheet-conveying means; suction-mechanism including a hollow member disposed in bearings and having an elongated seat in opposition to said sheet-conveying means; and means for adjusting the position of said member in its bearings whereby to variously present said slot with relation to said sheet-conveying means.

4. A printing-press appliance comprising the combination of sheet-conveying means; suction-mechanism, including a slotted member disposed in bearings in proximity to said sheet-conveying means; means for adjusting the position of said member in its bearings; and means for moving said member toward and away from said sheet-conveying means.

5. A printing-press appliance comprising the combination of a sheet-conveyer, a duct movably mounted across said conveyer and having a long narrow slot opposed thereto, the arrangement being such that the effective disposition of said slot may be varied with respect to said conveyer, a device for fixing said duct in a given position, suction means operatively connected with said duct, and automatically operating means for moving said duct toward and away from said conveyer.

6. A printing-press appliance comprising the combination of sheet-conveying means, a slotted duct movably mounted across said conveying means, means for reciprocating said duct toward and away from said conveying means, and suction means operatively connected with said duct.

7. A printing-press appliance comprising the combination with a rotary cylinder on which a paper sheet is adapted to be revolved, of a suction cleaning device arranged to act upon such sheet, said device including a draft duct having an opening terminating adjacent the cylinder periphery, and means associated with said duct and adapted to present its opening in the direction of movement of the passing portion of said cylinder periphery to permit the entry of air in a direction counter to the movement of the cylinder.

8. A printing-press appliance comprising the combination of sheet-conveying means, a slotted duct movably mounted across said conveying means, means for reciprocating said duct toward and away from said conveying means, means for adjusting the disposition of said slot with respect to said conveying means, and suction means operatively connected with said duct.

9. A printing-press appliance comprising the combination of sheet-conveying means, a movable supporting member, a brush mounted thereon, a duct adjustably mounted upon said member and provided with a slot extending transversely of the movement of said sheet, means for effecting the movement of said supporting member, means for fixing said duct in various positions upon said supporting member, and means for establishing a suction within said duct.

10. A printing-press appliance comprising the combination of a cylindrical sheet-conveyer, a movable brush adapted to intermittently contact across said sheet, a movable suction duct provided with a slot in intermittent operative proximity to said sheet, means for simultaneously controlling the movement of said brush and duct, said duct being positioned beyond said brush, and means for establishing a suction within said duct.

11. A printing-press appliance comprising the combination of a sheet-conveyer, a pair of levers positioned laterally thereof, a brush mounted upon said levers and adapted to contact with said sheet, a suction duct having a slot and adjustably mounted upon said levers, means for effecting the movement of said levers relative to said conveyer, means for fixing said duct, and suction means communicating with the latter.

12. A printing-press appliance comprising the combination of a frame, a cylindrical sheet-conveyer mounted for movement thereon, a lever upon said frame, means for moving said lever, a brush removably secured to the latter and adapted to engage said sheet, a duct rotatably mounted upon said lever and having a slot extending across said conveyer, said duct being positioned beyond said brush with reference to the direction of movement of said conveyer, means for fixing said duct in various positions about its axis, and means for establishing a suction within said duct.

13. A printing press appliance comprising the combination with a rotary cylinder on which a paper sheet is adapted to be once fully revolved, a paper-cleaning nozzle extending entirely across said cylinder, means for continuously producing a suction effect through said nozzle, a brush contacting said cylinder to remove dust and loose particles of paper therefrom, and means for drawing a paper sheet past said suction nozzle and brush and around said cylinder, the arrangement being such that both nozzle and brush are caused to operate alternately upon the surfaces of said cylinder and sheet respectively.

14. A printing press appliance comprising the combination with a rotary cylinder of a two revolution press on which a paper sheet is adapted to be revolved at every other revolution, a nozzle having a narrow opening opposed to said cylinder, means for intermittently drawing a paper sheet around upon said cylinder, and adapted to functionate with alternate revolutions of the latter, and suction means in communication with said nozzle, whereby to successively subject said sheet and cylinder to the action of said suction.

15. The combination with the cylinder of a two-revolution printing-press upon which a paper sheet is adapted to be once revolved, of a continuously operating suction-cleaning device arranged to act upon the sheet carried by the cylinder beyond the point of delivery from the periphery thereof with reference to the direction of revolution of the same whereby the successive travel of sheets from the cylinder at alternate revolutions may not be interfered with by such continuous suction effect.

16. The combination with the cylinder of a two-revolution printing-press upon which paper sheets are adapted to be once revolved, of a continuously operating suction-cleaning device mounted beyond the point at which the sheets are delivered at every other revolution, said device including a suction duct having its mouth terminating adjacent the cylinder periphery and adapted alternately to act upon the periphery of the cylinder and successive sheets carried thereby.

17. A printing-press appliance comprising the combination of sheet-conveying means, a movable supporting member, a duct mounted upon said member and provided with a slot extending transversely of the movement of said sheet, means for automatically effecting the movement of said supporting member, and means for establishing a suction within said duct.

18. A printing press appliance comprising the combination of a sheet conveyer, a brush attached in operative proximity thereto, a duct mounted adjacent said conveyer and provided with a slot opposed thereto, said duct being near said brush and adjustable, whereby to alter the presentation of said slot with reference to said brush, and suction means operatively connected with said duct.

19. The combination with the cylinder of a two-revolution printing press on which a sheet of paper is adapted to be once revolved, and means for directing the approach of a sheet toward and the delivery of the same away from said cylinder; of a continuously operative suction-cleaning device arranged to act upon the sheet while carried by the cylinder beyond the point of the delivery of the sheet away from the cylinder with reference to the direction of revolution of the latter.

20. A press having a rotary cylinder adapted to receive a sheet to print upon the same, a pneumatic cleaner adjacent said cylinder and near the path of said sheet when carried on said cylinder, means for inducing through said cleaner a suction effect of sufficient intensity to remove the dust and loose particles without stopping the travel of said sheet, and automatic means for temporarily withdrawing said cleaner from effective proximity to said cylinder upon the alternate revolutions of the latter.

21. A printing-press appliance comprising the combination of a cylindrical sheet-conveyer, a cam thereon, a pair of levers positioned near the sides thereof respectively, a roller upon one of said levers adapted to be engaged by said cam, a brush mounted across said levers and adapted to contact with said sheet, a spring normally maintaining such contact, said cam adapted automatically to lift said levers away from said conveyer against the action of said spring, a suction duct also carried by said levers and having its opening opposed to said conveyer, and means for creating a suction in said duct.

22. A printing-press appliance comprising the combination of a frame, a cylindrical sheet conveyer mounted for movement thereon, gripping mechanism carried by said cylinder to draw the sheet around with it, a support mounted for movement upon said frame, a brush detachably secured to said support and adapted normally to engage across said sheet with reference to its direction of movement, a suction device carried upon said support in operative proximity to said conveyer, and a cam upon said cylinder for intermittently oscillating said support away from said cylinder whereby to remove said brush and device out of the path of said mechanism at each revolution.

Signed by me, this 26th day of June, 1914.

JAMES E. DOYLE.

Attested by:
MARY COLEMAN,
WILLIAM C. BRACKEN.